United States Patent
Du et al.

(10) Patent No.: US 12,233,789 B2
(45) Date of Patent: Feb. 25, 2025

(54) PREDICTING FAILURES OF ELECTRICAL LOADS AND WIRING HARNESSES OF A VEHICLE

(71) Applicant: GM Global Technology Operations LLC, Detroit, MI (US)

(72) Inventors: Xinyu Du, Oakland Township, MI (US); Lyall Kenneth Winger, Waterloo (CA); Infane Lowe, Grand Blanc, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 18/149,802

(22) Filed: Jan. 4, 2023

(65) Prior Publication Data

US 2024/0217460 A1    Jul. 4, 2024

(51) Int. Cl.
  *B60R 16/02* (2006.01)
  *B60R 16/023* (2006.01)
  *B60R 16/03* (2006.01)
  *G06N 3/0464* (2023.01)

(52) U.S. Cl.
  CPC ...... *B60R 16/0232* (2013.01); *B60R 16/0207* (2013.01); *B60R 16/03* (2013.01); *G06N 3/0464* (2023.01)

(58) Field of Classification Search
  CPC . B60R 16/0232; B60R 16/0207; B60R 16/03; G06N 3/0464; G06N 3/044

USPC ............................................................. 340/438
  See application file for complete search history.

(56) References Cited

U.S. PATENT DOCUMENTS

| | | | |
|---|---|---|---|
| 11,840,253 B1* | 12/2023 | Pertsel | G06N 3/0464 |
| 11,935,129 B2* | 3/2024 | Tyrrell | G06T 7/246 |
| 2006/0208169 A1* | 9/2006 | Breed | B60R 21/01536 |
| | | | 250/221 |
| 2014/0005881 A1* | 1/2014 | Hardesty | G07C 5/0808 |
| | | | 701/32.8 |
| 2017/0010331 A1* | 1/2017 | Mano | H01M 10/486 |
| 2020/0327033 A1* | 10/2020 | Bazzi | G05B 23/024 |
| 2023/0356728 A1* | 11/2023 | Jain | G06F 3/013 |
| 2023/0398834 A1* | 12/2023 | Williams | B60L 58/12 |
| 2024/0043037 A1* | 2/2024 | Bagnell | B60W 60/0027 |
| 2024/0045204 A1* | 2/2024 | Bond | B60K 35/235 |
| 2024/0047982 A1* | 2/2024 | Green | B60R 16/033 |
| 2024/0166249 A1* | 5/2024 | Akif | B60L 15/2045 |
| 2024/0199101 A1* | 6/2024 | Wait | B61L 27/16 |
| 2024/0280618 A1* | 8/2024 | Quashie | G06N 3/0464 |

* cited by examiner

*Primary Examiner* — Omar Casillashernandez
(74) *Attorney, Agent, or Firm* — CANTOR COLBURN LLP (57) ABSTRACT

Examples described herein provide a method for predicting electrical failures within a vehicle. The method includes selectively enabling and disabling an electrical load for the vehicle. The method further includes collecting operational data about the electrical load during the selectively enabling and disabling of the electrical load. The method further includes training the model based at least in part on the operational data to predict a failure associated with the electrical load or a wiring harness associated with the electrical load.

20 Claims, 6 Drawing Sheets

PREDICTING FAILURES OF ELECTRICAL LOADS AND WIRING HARNESSES OF A VEHICLE

INTRODUCTION

Embodiments described herein generally relate to vehicles, and more specifically, to predicting failures of electrical loads and wiring harnesses of a vehicle.

Modern vehicles (e.g., a car, a motorcycle, a boat, or any other type of automobile) may be equipped with one or more batteries and/or generators to provide electric power to electrical loads. Examples of electrical loads include electric motors, lights, infotainment equipment, electronic control units, climate control systems, and/or the like, including combinations and/or multiples thereof. The electrical loads can be connected to the one or more batteries and/or generators via a wiring harness.

SUMMARY

In one exemplary embodiment, a method is provided for predicting electrical failures within a vehicle. The method includes selectively enabling and disabling an electrical load for the vehicle. The method further includes collecting operational data about the electrical load during the selectively enabling and disabling of the electrical load. The method further includes training the model based at least in part on the operational data to predict a failure associated with the electrical load or a wiring harness associated with the electrical load.

In addition to one or more of the features described herein, or as an alternative, further embodiments of the method may include that the operational data includes current data for the electrical load.

In addition to one or more of the features described herein, or as an alternative, further embodiments of the method may include that the operational data includes voltage data for the electrical load.

In addition to one or more of the features described herein, or as an alternative, further embodiments of the method may include that the operational data includes temperature data for the electrical load.

In addition to one or more of the features described herein, or as an alternative, further embodiments of the method may include that the operational data includes current data, voltage data, and temperature data for the electrical load.

In addition to one or more of the features described herein, or as an alternative, further embodiments of the method may include that the operational data is collected by a sensor associated with an electronic fuse electrically disposed between a battery of the vehicle and the electrical load.

In addition to one or more of the features described herein, or as an alternative, further embodiments of the method may include that the model is a machine learning model.

In addition to one or more of the features described herein, or as an alternative, further embodiments of the method may include that the machine learning model is a convolutional neural network.

In addition to one or more of the features described herein, or as an alternative, further embodiments of the method may include that the machine learning model is a long short-term memory neural network.

In addition to one or more of the features described herein, or as an alternative, further embodiments of the method may include that the model is a physics-based model based at least in part on at least one of resistance, capacitance, time domain reflection, frequency domain reflection, residual between a measurement and a model output, or a current differential relative to time.

In another exemplary embodiment, a method is provided. The method includes performing inference, using a trained model, to predict a failure associated with an electrical load or a wiring harness associated with the electrical load, wherein the model was trained using operational data generated at a plurality of vehicles. The method further includes generating an alert indicating the failure. The method further includes implementing a corrective action responsive to the failure.

In addition to one or more of the features described herein, or as an alternative, further embodiments of the method may include that the inference is performed for a vehicle at the vehicle.

In addition to one or more of the features described herein, or as an alternative, further embodiments of the method may include that the inference is performed for a vehicle remote from the vehicle.

In addition to one or more of the features described herein, or as an alternative, further embodiments of the method may include that the operational data includes current data for an electrical load.

In addition to one or more of the features described herein, or as an alternative, further embodiments of the method may include that the operational data includes voltage data for an electrical load.

In addition to one or more of the features described herein, or as an alternative, further embodiments of the method may include that the operational data includes temperature data for an electrical load.

In addition to one or more of the features described herein, or as an alternative, further embodiments of the method may include that the model is a convolutional neural network.

In addition to one or more of the features described herein, or as an alternative, further embodiments of the method may include that the model is a long short-term memory neural network.

In addition to one or more of the features described herein, or as an alternative, further embodiments of the method may include that the model is a physics-based model based at least in part on at least one of resistance, capacitance, time domain reflection, frequency domain reflection, residual between a measurement and a model output, or a current differential relative to time.

In another exemplary embodiment, a method is provided. The method includes selectively enabling and disabling an electrical load for a vehicle. The method further includes collecting operational data about the electrical load during the selectively enabling and disabling the electrical load. The method further includes training a model to predict failures associated with the electrical load or a wiring harness associated with the electrical load, the trained model being based at least in part on the operational data. The method further includes detecting, using the trained model, a failure associated with the electrical load or the wiring harness. The method further includes implementing a corrective action responsive to detecting the failure.

The above features and advantages, and other features and advantages, of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Vehicles use wiring harnesses to transmit electrical power from one or more electrical power sources (e.g., a battery) to one or more electrical loads. Wiring harnesses and electrical loads can experience failures. It can be difficult to detect where a failure occurred and the root cause of the failure. For example, it may be desirable to detect electronic control unit (ECU) no-trouble-found issues, which may be a hardware issue and/or a software issue.

Wiring harness failures can be difficult to predict or diagnose, which may cause a service technician to take a trial-and-error approach to fixing these types of failures. Further, harness failures can lead to walk-home events, which causes the vehicle to become inoperable and is an inconvenience to occupants of the vehicle. Electrical loads can also fail. A "no-trouble-found" rate for electrical loads (e.g., motors, lights, ECUs, and/or the like, including combinations and/or multiples thereof) is conventionally very high, which often result in unnecessary repairs (e.g., replacing multiple parts without knowing which is the faulty part).

One or more embodiments described herein provide for predicting failures of electrical loads and wiring harnesses of a vehicle. According to an embodiment, an active prognosis approach is described that forces a load on/off and uses a smart energy center to record operational data about the load and predict load failures and/or wiring harness failures. According to one or more embodiments described herein, the smart energy center forces loads on/off to create signal excitations, records the transient/static responses to the load change, and uses a prognostic approach to analyze system health for wiring harness or loads.

Figure 1:
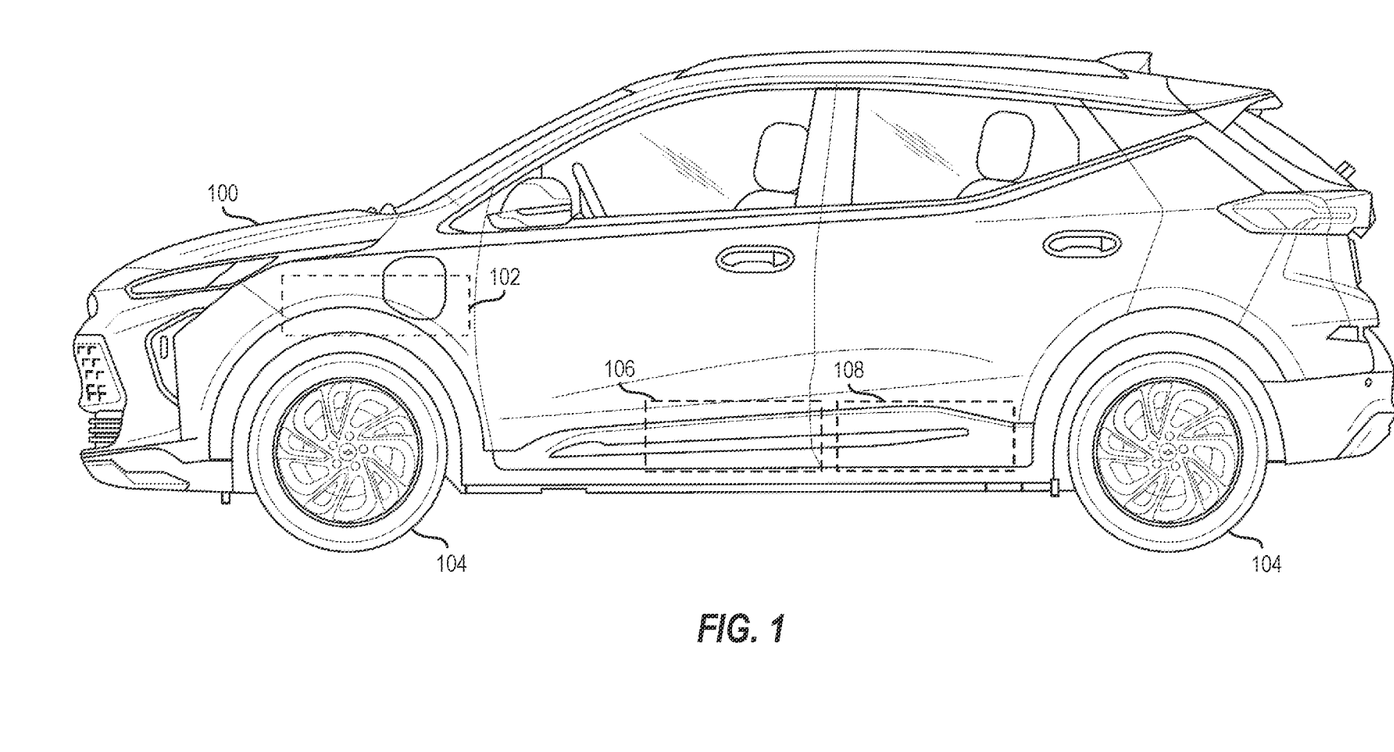
FIG. 1 shows a schematic illustration of a vehicle according to one or more embodiments described herein.

FIG. 1 shows a vehicle 100 according to one or more embodiments described herein. The vehicle 100 can be a car, a truck, a van, a bus, a motorcycle, a boat, or any other type of automobile. According to an embodiment, the vehicle 100 includes an internal combustion engine fueled by gasoline, diesel, or the like. According to another embodiment, the vehicle 100 is a hybrid electric vehicle partially or wholly powered by electrical power. According to another embodiment, the vehicle 100 is an electric vehicle powered by electrical power. In the example of FIG. 1, the vehicle 100 includes an internal combustion engine 102. The internal combustion engine 102 can be mechanically coupled to wheels 104 of the vehicle 100 to apply rotational force to the wheels 104, creating a driveline. In some examples, a vehicle 100 can include one or more batteries 106 to provide electric power to electrical loads. Examples of electrical loads include electric motors, lights, infotainment equipment, electronic control units, climate control systems, and/or the like, including combinations and/or multiples thereof. The vehicle 100 can include a smart energy center 108 to manage electric power in the vehicle 100, which is described in more detail with reference to FIG. 2.

Figure 2:
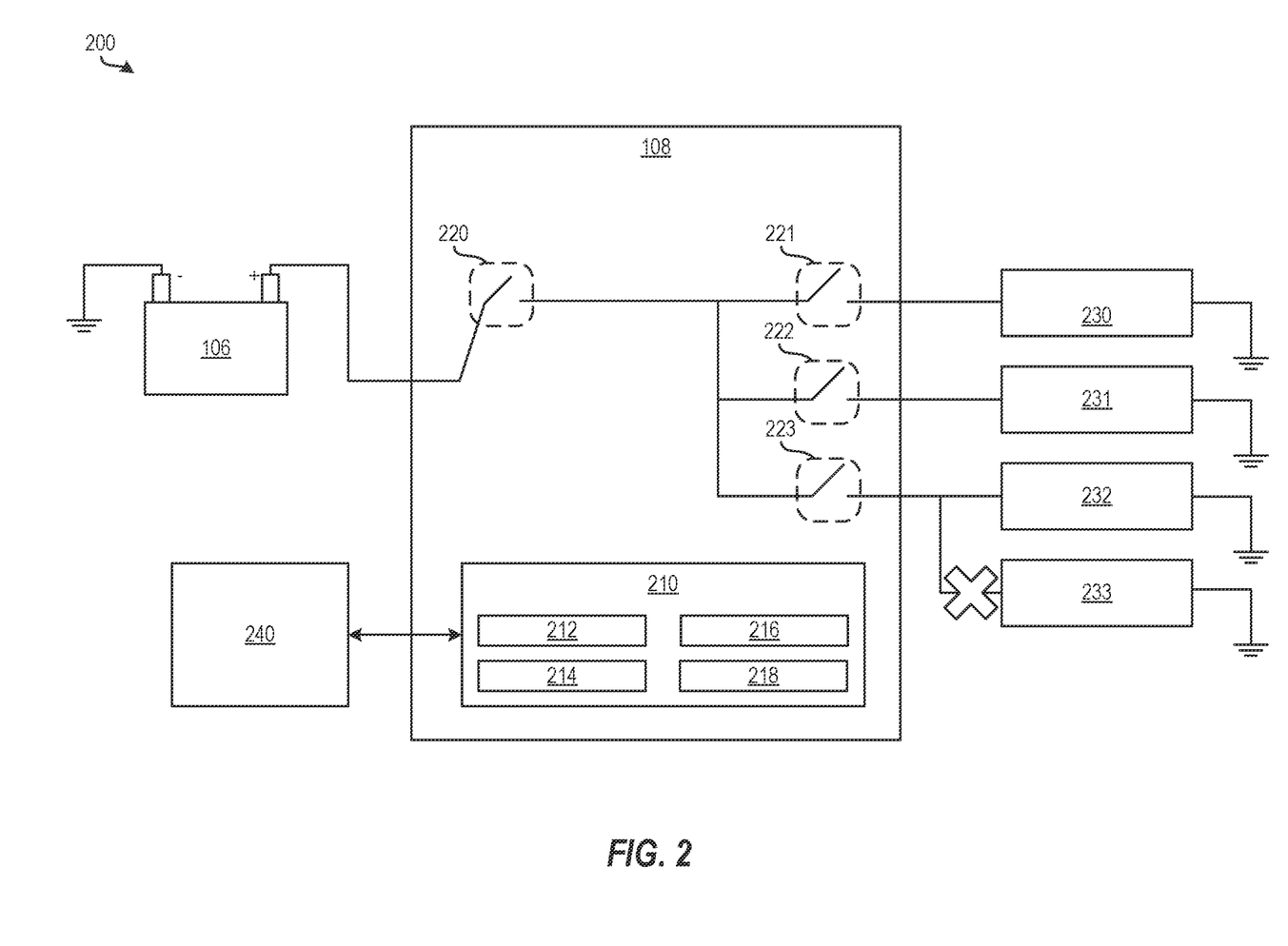
FIG. 2 shows a block diagram of a system for predicting failures of electrical loads and wiring harnesses of the vehicle of FIG. 1 according to one or more embodiments described herein.

In particular, FIG. 2 shows a block diagram of a system 200 for predicting failures of electrical loads and wiring harnesses of the vehicle of FIG. 1 according to one or more embodiments described herein. The system 200 can be disposed in the vehicle 100, for example. The system 200 includes the battery 106, which may be representative of one or more batteries. The system 200 also includes the smart energy center 108, which is responsible for managing electrical power in the vehicle 100, such as managing electrical power transmitted from the battery 106 to one or more of electrical loads 231, 232, 233, managing electrical power transmitted from a generator 230 (or onboard direct current (DC)-to-DC converter) to the battery 106 and/or to one or more of the electrical loads 231, 232, 233, and/or the like, including combinations and/or multiples thereof. It should be appreciated that other numbers, configurations, and arrangements of batteries, electrical loads, and/or generators are possible and within the scope of the claims.

The smart energy center 108 can include one or more electrical fuses ("e-fuses") 220, 221, 222, 223 configured and arranged as shown, although it should be appreciated that other configurations and arrangements are possible and within the scope of the claims. An e-fuse provides for limiting circuit currents and voltages based on thresholds considered "safe" or otherwise desirable. For example, an e-fuse can have a current threshold, and the e-fuse uses a current sensor to detect a current flowing through the e-fuse. If the current sensor senses a current in excess of the current threshold, the e-fuse opens, which causes the flow of current to cease. According to one or more embodiments described herein, one or more of the e-fuses 220-223 can include a current sensor, a voltage sensor, a temperature sensor, and/or the like, including combinations and/or multiples thereof. According to one or more embodiments described herein, the controller 210 can force one or more of the e-fuses 220-223 open and/or closed.

The controller 210 (e.g., also referred to as a "controller" or "processing system") supports the management of electrical power through the system 200 of the vehicle 100. It is understood that one or more embodiments described herein is capable of being implemented in conjunction with any other type of computing environment now known or later developed. The controller 210 can include a processor 212, which may be one or more processing units and/or one or more multi-core processing units. In aspects of the present disclosure, each processing unit can include a reduced instruction set computer (RISC) microprocessor. As another example, the processor 212 can be a special-purpose processing device, such as application specific hardware, application specific integrated circuits (ASICs), application specific special processors (ASSPs), field programmable gate arrays (FPGAs), embedded controllers, hardwired circuitry, and/or the like, including combinations and/or multiples thereof. The processor 212 can be coupled to a memory 214, which can be any suitable type of memory device for storing data temporarily (e.g., random access memory (RAM)) and/or persistently (e.g., read only memory (ROM). According to aspects of the present disclosure, predicting failures of electrical loads and wiring harnesses of a vehicle as described herein can be implemented using a combination of hardware and programming. The programming can be processor executable instructions stored on a tangible memory, and the hardware can include the processor 212 for executing those instructions. Thus a system memory (e.g., the memory 214) can store program instructions that when executed by the processor 212 can predict failures of electrical loads and wiring harnesses of a vehicle as described herein, such as using a data engine 216 and/or a machine learning (ML) engine 218.

Figure 3:
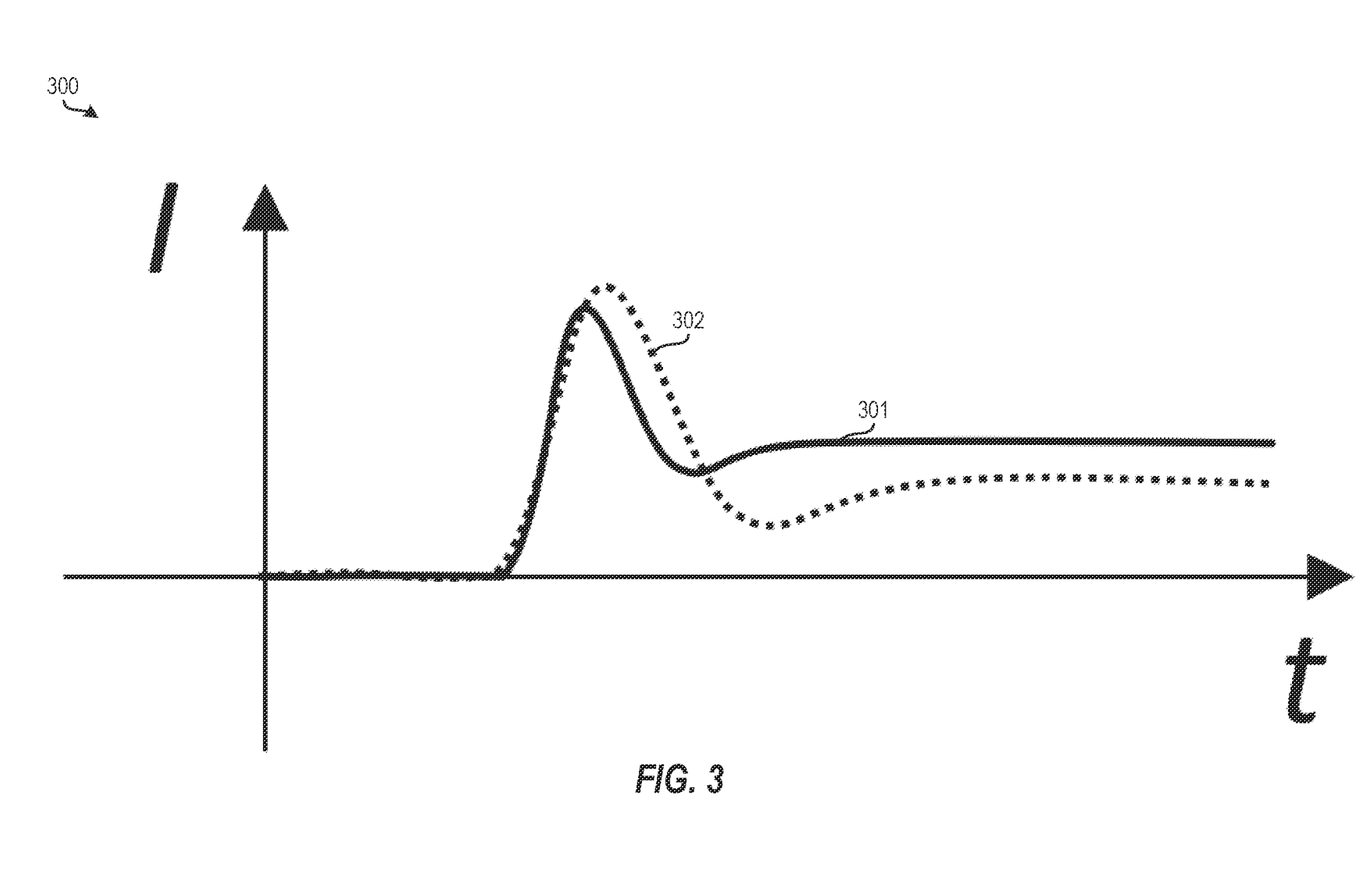
FIG. 3 shows a graph according to one or more embodiments described herein.

The data engine 216 performs or assists with the collection and/or receipt of data, such as operational data from one or more of the e-fuses 220-223. For example, one or more of the e-fuses 220-223 can include a voltage sensor to sense a voltage, a current sensor to sense a current, a temperature sensor to sense a temperature, and/or the like, including combinations and/or multiples thereof. The ML engine 218 can apply the operational data to a machine learning model to make predictions about failures of electrical loads and/or wiring harnesses of the vehicle 100. According to one or more embodiments, the operational data can be compared to nominal operational data, as shown in FIG. 3. Particularly, FIG. 3 shows a graph 300 according to one or more embodiments described herein. The graph 300 plots current (I) versus time (t) for nominal operational data 301 and measured operational data 302. It should be appreciated that other graphs are also possible for other operational data, such as voltage, temperature, and/or the like, including combinations and/or multiples thereof. Where the measured operational data 302 varies from the nominal operational data 301 (e.g., by a threshold amount, by a percent difference threshold, and/or the like, including combinations and/or multiples thereof), a fault can be said to have occurred.

With continued reference to FIG. 2, according to an embodiment, the controller 210 can transmit data to and/or receive data from a remote processing system 240. The remote processing system 240 can be a cloud computing system according to an embodiment. An example of the remote processing system 240 is shown in FIG. 4 and is described further herein.

Figure 4:
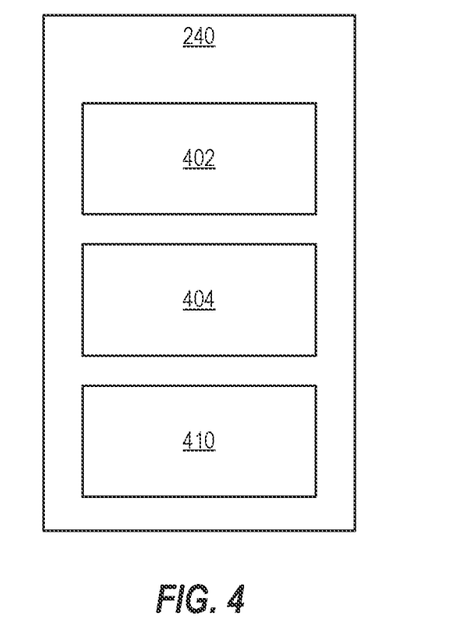
FIG. 4 shows a block diagram of the remote processing system of FIG. 2 according to one or more embodiments described herein.

FIG. 4 shows a flow diagram of the remote processing system 240 of FIG. 2 according to one or more embodiments described herein. The remote processing system 240 includes a processor 402, which may be one or more processing units and/or one or more multi-core processing units. In aspects of the present disclosure, each processing unit can include a reduced instruction set computer (RISC) microprocessor. As another example, the processor 402 can be a special-purpose processing device, such as application specific hardware, application specific integrated circuits (ASICs), application specific special processors (ASSPs), field programmable gate arrays (FPGAs), embedded controllers, hardwired circuitry, and/or the like, including combinations and/or multiples thereof. The processor 402 can be coupled to a memory 404, which can be any suitable type of memory device for storing data temporarily (e.g., random access memory (RAM)) and/or persistently (e.g., read only memory (ROM). According to aspects of the present disclosure, predicting failures of electrical loads and wiring harnesses of a vehicle as described herein can be implemented using a combination of hardware and programming. The programming can be processor executable instructions stored on a tangible memory, and the hardware can include the processor 402 for executing those instructions. Thus a system memory (e.g., the memory 404) can store program instructions that when executed by the processor 402 can predict failures of electrical loads and wiring harnesses of a vehicle as described herein.

According to one or more embodiments described herein, the remote processing system 240 receives operational data from the vehicle 100 and/or from additional vehicles. Using the operational data from one or more vehicles, the model training engine 410 trains a model to detect a failure of an electrical load and/or wiring harness of a vehicle. According to one or more embodiments described herein, the model can be a machine learning model, a physics-based model, and/or the like, including combinations and/or multiples thereof, as described herein. The model can then be transmitted to the vehicle 100 to enable the vehicle 100 to detect failures of electrical loads and/or wiring harnesses.

One or more embodiments described herein can utilize machine learning techniques to perform tasks, such as predicting failures of electrical loads and wiring harnesses of a vehicle. More specifically, one or more embodiments described herein can incorporate and utilize rule-based decision making and artificial intelligence (AI) reasoning to accomplish the various operations described herein, namely predicting failures of electrical loads and wiring harnesses of a vehicle. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for predicting failures of electrical loads and wiring harnesses of a vehicle, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of predicting failures of electrical loads and wiring harnesses of a vehicle as described herein.

Figure 5:
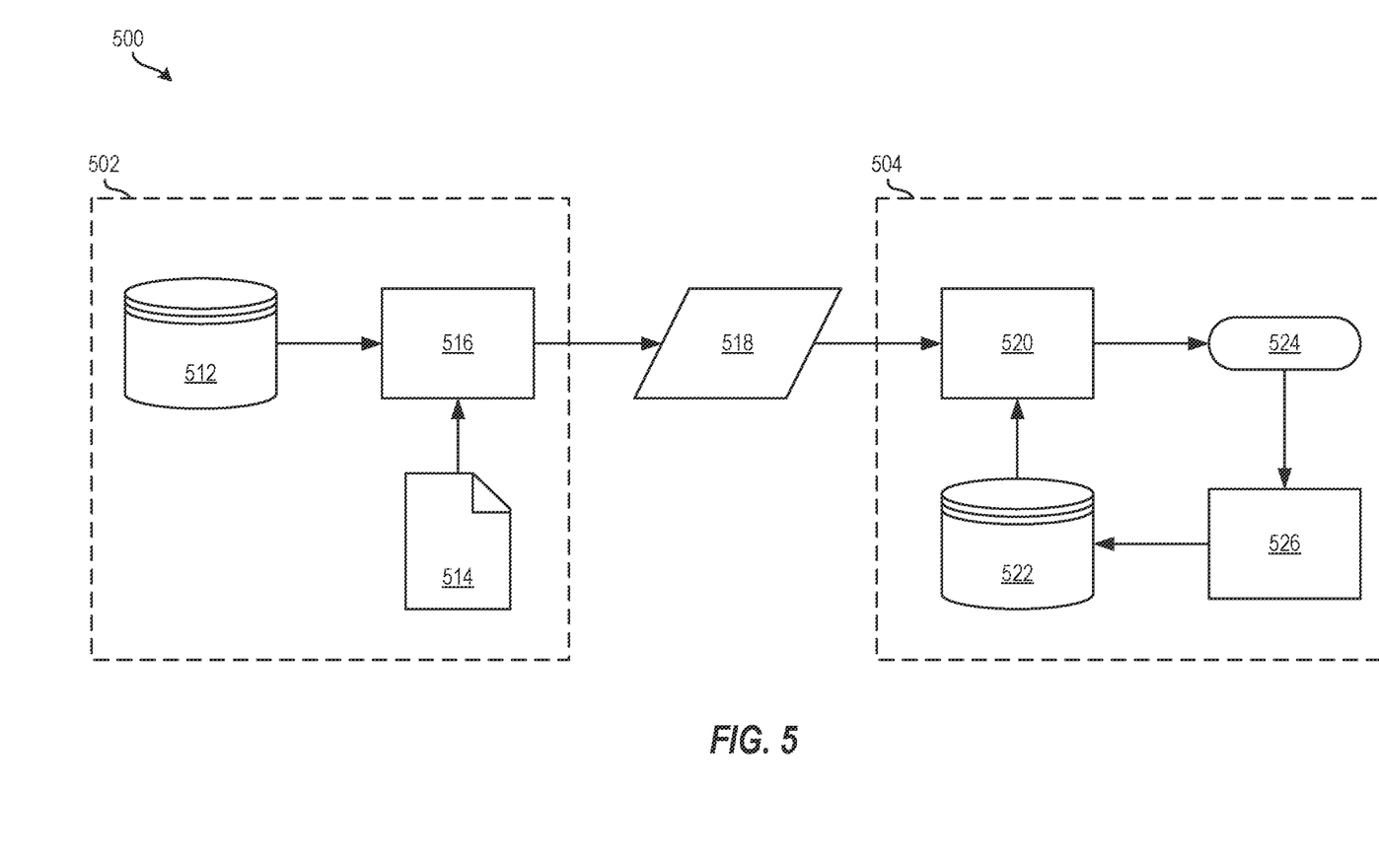
FIG. 5 shows a block diagram of components of a machine learning training and inference system according to one or more embodiments described herein.

Systems for training and using a machine learning model are now described in more detail with reference to FIG. 5. Particularly, FIG. 5 depicts a block diagram of components of a machine learning training and inference system 500 according to one or more embodiments described herein. The machine learning training and inference system 500 performs training 502 and inference 504. During training 502, a training engine 516 trains a model (e.g., the trained model 518) to perform a task, such as to predict failures of electrical loads and wiring harnesses of a vehicle. Inference 504 is the process of implementing the trained model 518 to perform the task, such as to predict failures of electrical loads and wiring harnesses of a vehicle, in the context of a larger system (e.g., a system 526). All or a portion of the machine learning training and inference system 500 shown in FIG. 5 can be implemented, for example by all or a subset of the controller 210 of FIG. 2 and/or the remote processing system 240 of FIGS. 2 and 4.

The training 502 begins with training data 512, which may be structured or unstructured data. According to one or more embodiments described herein, the training data 512 includes, for example, operational data from one or more of the e-fuses 220-223. Examples of operational data can include current data, voltage data, temperature data, and/or the like, including combinations and/or multiples thereof. The training engine 516 receives the training data 512 and a model form 514. The model form 514 represents a base model that is untrained. The model form 514 can have preset weights and biases, which can be adjusted during training. It should be appreciated that the model form 514 can be selected from many different model forms depending on the task to be performed. For example, where the training 502 is to train a model to perform image classification, the model form 514 may be a model form of a CNN. As another example, where the training 502 is to train a model to predict failures of electrical loads and wiring harnesses of a vehicle, the model form 514 may be a model form of a CNN, a recurrent neural network (RNN), a long short-term memory (LSTM), and/or the like, including combinations and/or multiples thereof.

The training 502 can be supervised learning, semi-supervised learning, unsupervised learning, reinforcement learning, and/or the like, including combinations and/or multiples thereof. For example, supervised learning can be used to train a machine learning model to predict failures of electrical loads and wiring harnesses of a vehicle. To do this, the training data 512 includes labeled operational data (e.g., current, voltage, temperature, and/or the like, including combinations and/or multiples thereof), including operational data that represents failures with associated labels (ground truth) and other operational data that nominal (e.g., that do not represent failures) with associated labels. In this example, the training engine 516 takes as input operational data from the training data 512, makes a prediction for a failure of an electrical load or wiring harness, and compares the prediction to the known label. The training engine 516 then adjusts weights and/or biases of the model based on results of the comparison, such as by using backpropagation. The training 502 may be performed multiple times (referred to as "epochs") until a suitable model is trained (e.g., the trained model 518). In the case of predicting failures of electrical loads and wiring harnesses of a vehicle, the training engine 516 takes an input operational data from the e-fuses 220-223.

Once trained, the trained model 518 can be used to perform inference 504 to perform a task, such as to predict failures of electrical loads and wiring harnesses of a vehicle. The inference engine 520 applies the trained model 518 to new data 522 (e.g., real-world, non-training data). For example, if the trained model 518 is trained to classify images of a particular object, such as a chair, the new data 522 can be an image of a chair that was not part of the training data 512. In this way, the new data 522 represents data to which the trained model 518 has not been exposed. The inference engine 520 makes a prediction 524 (e.g., a classification of an object in an image of the new data 522, a prediction of a failure of a wiring harness or electrical load, and/or the like) and passes the prediction 524 to the system 526 (e.g., the smart energy center 108 of FIG. 2). The system 526 can, based on the prediction 524, taken an action, perform an operation, perform an analysis, and/or the like, including combinations and/or multiples thereof. In some embodiments, the system 526 can add to and/or modify the new data 522 based on the prediction 524.

In accordance with one or more embodiments, the predictions 524 generated by the inference engine 520 are periodically monitored and verified to ensure that the inference engine 520 is operating as expected. Based on the verification, additional training 502 may occur using the trained model 518 as the starting point. The additional training 502 may include all or a subset of the original training data 512 and/or new training data 512. In accordance with one or more embodiments, the training 502 includes updating the trained model 518 to account for changes in expected input data.

Figure 6:
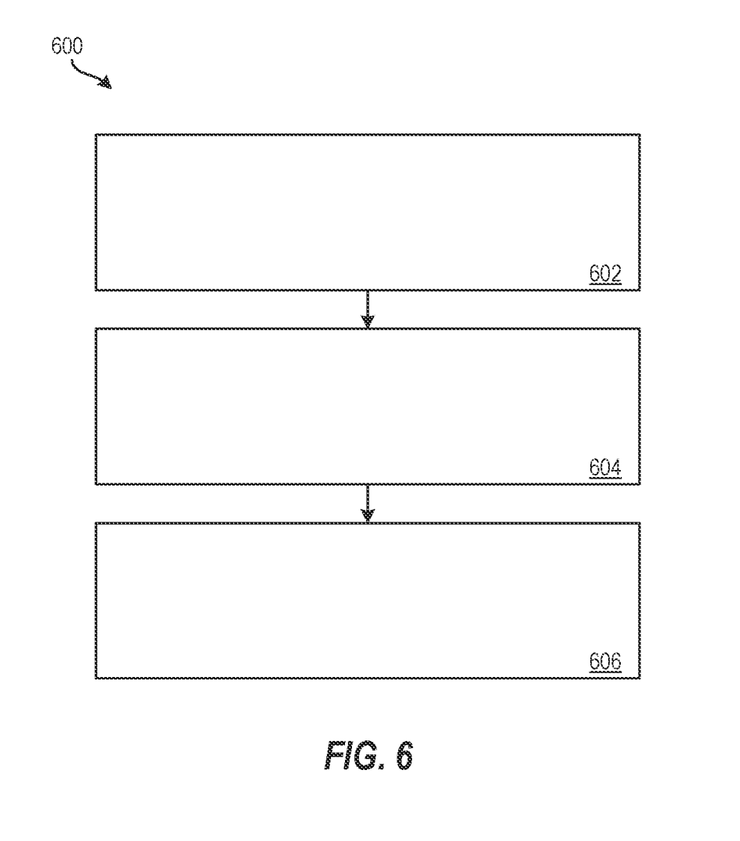
FIG. 6 shows a flow diagram of a method for predicting failures of electrical loads and wiring harnesses of a vehicle according to one or more embodiments described herein.

FIG. 6 shows a flow diagram of a method 600 for predicting failures of electrical loads and wiring harnesses of a vehicle according to one or more embodiments described herein. The method 600 can be performed by any suitable system, controller, or device, for example, by the controller 210, by the remote processing system 240, the machine learning training and inference system 500, and/or the like, including combinations and/or multiples thereof.

The method 600 starts at block 602, where the controller 210 selectively enables (e.g., turn on) and disables (e.g., turn off) an electrical load (e.g., one of the electrical loads 231-233) for the vehicle 100. As an example, the controller 210 transmits a first message/command to the electrical load 233 to cause the electrical load 233 to turn on, then transmits a second message/command to the electrical load 233 to cause the electrical load 233 to turn off. According to another embodiment, the controller 210 can cause the electrical load 233 to turn on/off with high frequency for a short period of time using the e-fuse 223.

During the selectively enabling/disabling of loads at block 602, the controller 210 can collect operational data about the electrical load at block 604. For example, the controller 210 can collect current, voltage, and/or temperature data at the e-fuse 223 when the electrical load 233 is selectively enabled/disabled. According to one or more embodiments described herein, the operational data can be collected during service diagnostics, remote diagnostics, preflight checks, and/or the like, including combinations and/or multiples thereof. According to an embodiment where the high frequency turn on/off occurs, the high frequency responses can be recorded.

At block 606, a model is trained based at least in part on the operational data to predict a failure associated with the electrical load or a wiring harness associated with the electrical load. For example, the machine learning training and inference system 500 trains a machine learning model (e.g., a CNN, an RNN, an LSTM, and/or the like, including combinations and/or multiples thereof) to predict a failure associated with an electrical load or a wiring harness associated with the electrical load. As another example, the remote processing system 240 trains a physics-based model to predict a failure associated with an electrical load or a wiring harness associated with the electrical load. The physics-based model can be based at least in part on at least one of resistance, capacitance, time domain reflection, frequency domain reflection, residual between a measurement and a model output, a current differential relative to time, and/or the like, including combinations and/or multiples thereof. According to one or more embodiments described herein, the training and the inference can be separated. For example, inference can be performed using a pre-trained model to make a prediction without explicitly performing the training.

Data can be aggregated from multiple vehicles with the same or similar configuration. According to one or more embodiments described herein, warranty data and/or diagnostic trouble code (DTC) data can be used to label a ground truth, which can be used to train and/or validate the model.

Additional processes also may be included. According to one or more embodiments described herein, the trained model can be used to perform inference to predict a failure of an electrical component and/or wiring harness within the vehicle 100. According to one or more embodiments described herein, responsive to detecting a failure, the vehicle 100 can present an alert to an occupant (e.g., driver) of the vehicle 100, can transmit an alert to a remote system, such as the remote processing system 240, and/or the like, including combinations and/or multiples thereof. According to one or more embodiments described herein, responsive to detecting a failure, the vehicle 100 can implement a corrective action to improve operation/function of the vehicle 100, such as reducing an amount of electrical power provided to an electrical load associated with the failure, disable the electrical load associated with the failure, and/or the like, including combinations and/or multiples thereof.

It should be understood that the process depicted in FIG. 6 represents an illustration, and that other processes may be added or existing processes may be removed, modified, or rearranged without departing from the scope of the present disclosure.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for training a model for predicting electrical failures within a vehicle comprising:
   selectively enabling and disabling an electrical load for the vehicle, wherein the selectively enabling comprises enabling and disabling the electrical load with high frequency for a short period of time using an electronic-fuse (e-fuse);
   collecting operational data about the electrical load during the selectively enabling and disabling of the electrical load, wherein collecting the operational data comprises recording transient/static responses during the enabling and disabling; and
   training the model based at least in part on the operational data to predict a failure associated with the electrical load or a wiring harness associated with the electrical load.

2. The method of claim 1, wherein the operational data comprises current data for the electrical load.

3. The method of claim 1, wherein the operational data comprises voltage data for the electrical load.

4. The method of claim 1, wherein the operational data comprises temperature data for the electrical load.

5. The method of claim 1, wherein the operational data comprises current data, voltage data, and temperature data for the electrical load.

6. The method of claim 1, wherein the operational data is collected by a sensor associated with an electronic fuse electrically disposed between a battery of the vehicle and the electrical load.

7. The method of claim 1, wherein the model is a machine learning model.

8. The method of claim 7, wherein the machine learning model is a convolutional neural network.

9. The method of claim 7, wherein the machine learning model is a long short-term memory neural network.

10. The method of claim 1, wherein the model is a physics-based model based at least in part on at least one of resistance, capacitance, time domain reflection, frequency domain reflection, residual between a measurement and a model output, or a current differential relative to time.

11. A method comprising:
performing inference, using a trained model, to predict a failure associated with a wiring harness associated with an electrical load, wherein the model was trained using operational data generated at a plurality of vehicles, wherein the model is trained using warranty data and diagnostic trouble code (DTC) data as a ground truth;
generating an alert indicating the failure; and
implementing a corrective action responsive to the failure.

12. The method of claim 11, wherein the inference is performed for a vehicle at the vehicle.

13. The method of claim 11, wherein the inference is performed for a vehicle remote from the vehicle.

14. The method of claim 11, wherein the operational data comprises current data for an electrical load.

15. The method of claim 11, wherein the operational data comprises voltage data for an electrical load.

16. The method of claim 11, wherein the operational data comprises temperature data for an electrical load.

17. The system of claim 11, wherein the model is a convolutional neural network.

18. The system of claim 11, wherein the model is a long short-term memory neural network.

19. The system of claim 11, wherein the model is a physics-based model based at least in part on at least one of resistance, capacitance, time domain reflection, frequency domain reflection, residual between a measurement and a model output, or a current differential relative to time.

20. A method comprising:
selectively enabling and disabling an electrical load for a vehicle, wherein the selectively enabling comprises enabling and disabling the electrical load with high frequency for a short period of time using an electronic-fuse (e-fuse);
collecting operational data about the electrical load during the selectively enabling and disabling the electrical load, wherein collecting the operational data comprises recording transient/static responses during the enabling and disabling;
training a model to predict failures associated with the electrical load or a wiring harness associated with the electrical load, the trained model being based at least in part on the operational data;
detecting, using the trained model, a failure associated with the electrical load or the wiring harness; and
implementing a corrective action responsive to detecting the failure.

* * * * *